Dec. 2, 1958 W. M. DUNCAN 2,862,463
INCINERATOR
Filed Dec. 15, 1954 2 Sheets-Sheet 1
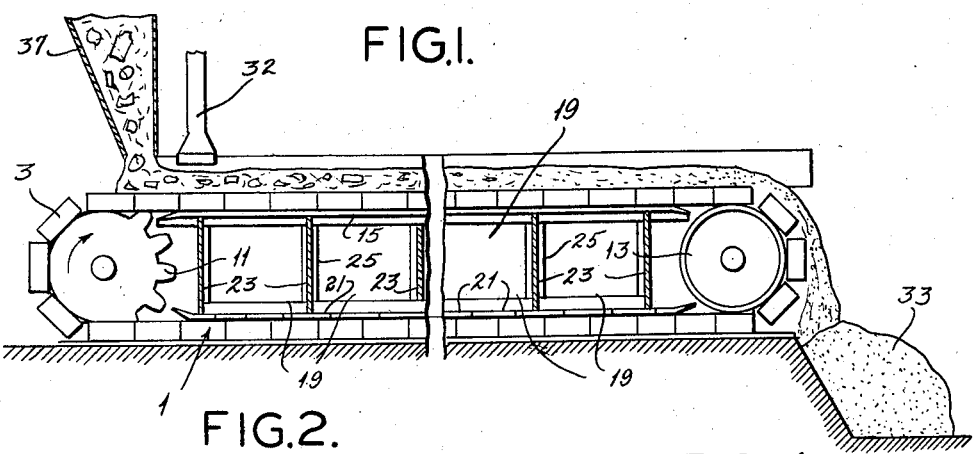
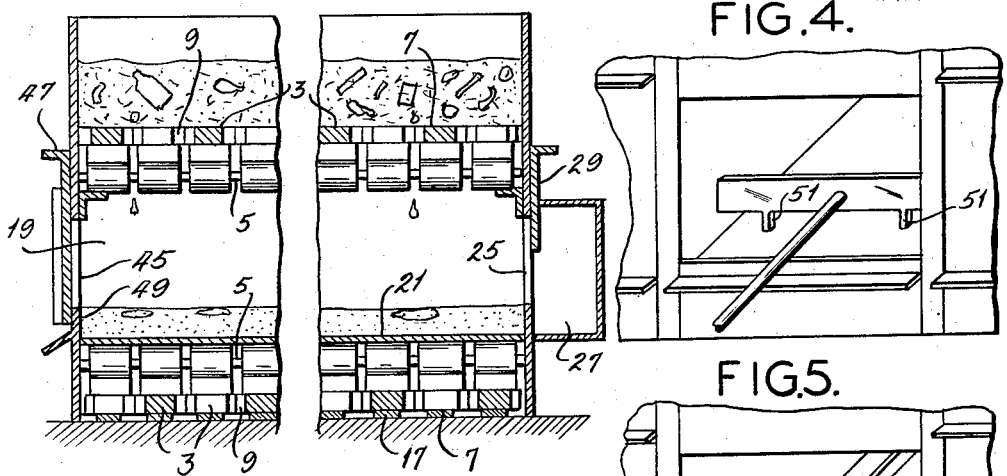
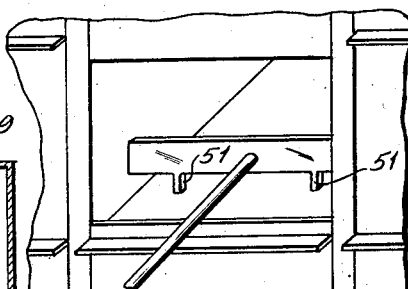
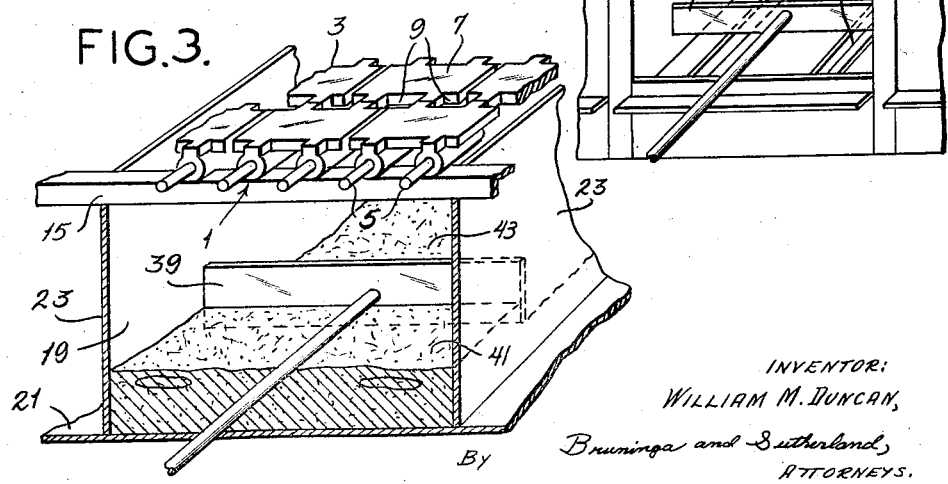
INVENTOR:
WILLIAM M. DUNCAN,
Bruninga and Sutherland,
BY ATTORNEYS.

Dec. 2, 1958 — W. M. DUNCAN — 2,862,463
INCINERATOR
Filed Dec. 15, 1954 — 2 Sheets-Sheet 2

INVENTOR:
WILLIAM M. DUNCAN
By Bruninga and Sutherland,
ATTORNEYS

United States Patent Office 2,862,463
Patented Dec. 2, 1958

2,862,463
INCINERATOR

William M. Duncan, Alton, Ill.

Application December 15, 1954, Serial No. 475,472

2 Claims. (Cl. 110—170)

This invention relates generallly to the construction and methods of operation of continuous-grate machines used in burning refuse.

In heavily settled communities, refuse disposal is a major problem because of the distance that the refuse must be hauled to be dumped. It has therefore been proposed that refuse be burned using a moving-grate type of machine somewhat similar to a sintering machine or chain-grate stoker. A wide endless chain of grate-forming links is trained about a drive sprocket and idler so that the upper reach forms a moving grate upon which the refuse may be burned. As refuse is carried along the grate-forming upper reach, air is forced through passages between the links to insure combustion, and upwardly-opening wind boxes are located below the upper reach for the purpose of controlling draft.

One of the disadvantages in using such a machine as an incinerator is that general refuse often contains material, such as glass and metal, which melts and falls through the grate to the floor of a wind box. The floor, which is formed of steel plate, is heated by these molten globs, and since the heating is localized, the plates warp and separate, thus allowing leakage to occur. Accordingly, this invention is directed to a construction and method of operation which avoids warping of the floor from this cause.

Briefly, siftings through the grate are permitted to accumulate on the floor of a wind box, and only that portion at a predetermined level from the floor of the box is removed, so that a bed of siftings remains at all times. The principal content of the siftings in such a machine is ash, so that when a bed of siftings is left upon the floor, the molten material solidifies on top of the bed and is held in insulated relationship from the floor of the wind box. While the floor is to some extent heated by the bed, the heating action is more uniform across the metal plates, and warping is less likely to occur.

Several methods of operation may be employed. In one instance, guide rails are mounted horizontally over the floor of a wind box, so that a rake may be drawn over these rails in elevated relationship. Alternatively, a rake may carry guides, which project downwardly to maintain the body of the rake elevated above the floor of the wind box.

While this system provides protection for the floor of a wind box, occasionally molten material will collect against or near one of the side walls of a box. In that event, the side-forming plates are subjected to localized heating, with the result that the plates warp and leakage may develop. It is therefore also an object of the invention to provide an economical system of preventing leakage at the sides of a wind box. In one embodiment of the invention, vertical baffles are mounted on the floor of a wind box adjacent to but in spaced relationship from the side walls. The spaces defined by these baffles are hooded or filled with ash in order to prevent entry of molten material. Although the molten material may come in contact with the baffles, the sealed side walls are protected and leakage is effectively prevented.

Alternatively, the sides of the wind box may be of double-walled construction, so that a cooling medium, such as water, may be circulated therein. In this connection, the invention also contemplates that other portions of the machine may be protected from non-uniform overheating by means of water-cooled passageways. For example, the sides of the grate may be of double-walled construction to permit circulation of a cooling liquid. If the grate sides are adapted to move with the grate bed, they may be disposed for sliding engagement with cooling pipes of rectangular cross section.

Other features of the invention will be in part apparent from and in part pointed out in the following detail description taken in connection with the accompanying drawings, in which:

Fig. 1 is a longitudinal vertical section of an incinerator embodying the invention;

Fig. 2 is a transverse section of the machine shown in Fig. 1;

Fig. 3 is an oblique sectional view showing certain portions of the machine in greater detail and also disclosing how the wind boxes are emptied;

Fig. 4 is an oblique detail view of the side of the machine illustrating a preferred cleaning implement;

Fig. 5 is a view similar to that of Fig. 4, but showing an alternative embodiment of this invention;

Figure 6:
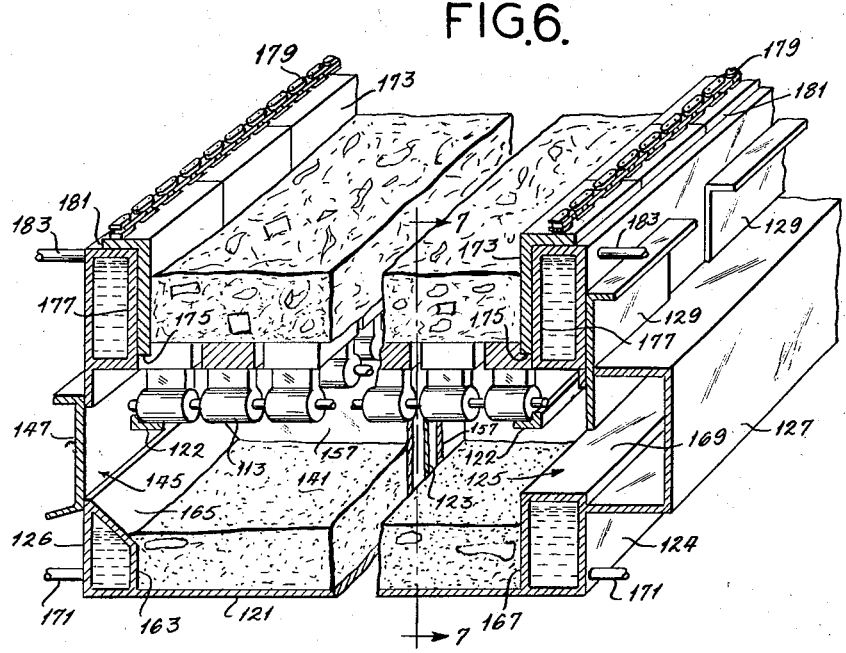
Fig. 6 is an oblique sectional view similar to that of Fig. 2, but illustrating a machine embodying other features of the invention.

Referring to the drawings, the machine is shown to comprise a wide endless belt 1 of chain links 3, which are connected by transverse rods 5. The link heads 7 are adapted to form a grate, the arrangement being such as to provide draft passages 9 therebetween. This chain is trained about a drive sprocket 11 at one end of the machine and about an idler 13 at the other end; and the upper reach of the chain rides over rails 15, whereas the lower reach is supported upon longitudinal members 17. In order to provide for a proper distribution of the draft throughout the machine, the space between the upper and lower reaches is boxed off into a plurality of chambers 19, which are sometimes referred to as wind boxes.

Steel plates are assembled together to form a horizontal floor 21 and vertical transverse partitions 23, the top being left open so that air forced into the chambers is expelled upwardly through the grate (and the refuse lying thereon) to facilitate combustion. Openings 25 along one side of the machine communicate with a manifold 27, and gates 29 are slidably secured over the openings 25 in order to vary the air flow to each of the wind boxes. Necessarily, the chambers 19 should be fairly well sealed so that leakage does not occur except through the passages 9 in the grate. The refuse is fed through a hopper 37 onto the grate-forming upper reach at one end thereof, and the driving sprocket 11 is rotated to move the grate toward the other end. Fuel might be admixed with the refuse to facilitate combustion, and an igniter 32 may be located near the hopper to initiate combustion. As the refuse moves toward the other end, it is reduced to ashes, and the ashes are dumped at 33 as the chain moves about the idler.

Over the course of time, some of the finer material will sift through the draft passages, and the wind boxes accordingly must be emptied from time to time. As the refuse is heated and moves toward the other end, some of the refuse (glass and metal) is melted and falls through the draft passages 9 to collect in pools upon the floor 21 of a wind box. Such molten globs necessarily cool slowly, with the result that the floor 21 is locally heated; and such localized heating causes the plates, from which the floor is formed, to warp and curl. The result is that cracks are opened between the plates and considerable leakage develops. While such localized heating could be prevented by installing a lining of refractory bricks, the present invention contemplates a more economical solution to the problem.

It may be noted that as such material is melted, some of the refuse is also converted to ash, hence the siftings include a heavy ash content. I have discovered that in the course of operation, the bed of siftings, and particularly the lower portion thereof, assumes the characteristics of a lining of refractory bricks insofar as protection of the floor 21 is concerned. Apparently the siftings that collect in such a refuse incinerator have the quality of forming a lining which holds molten metal in insulated relationship from and causes more uniform (non-warping) heating of the steel floor 21, this being so especially if the bed is not disturbed excessively.

Accordingly, the invention contemplates a method of operation whereby only that portion of the siftings above a predetermined level is removed from each wind box when the wind boxes are emptied. To that end, I propose the use of a rake 39 (Fig. 3) which is guided over the floor 21 in spaced relationship therefrom to remove the upper part 41 of the siftings while leaving portion 43 behind. Openings 45 are provided along one side of the machine to permit such raking, these openings normally being closed by gates 47. The openings are also in spaced relationship above the floor, a wall member 49 being provided in part for this purpose.

In operation, the gates 47 are opened and the siftings are raked through the openings 45. The rake may have elevating feet 51, as shown in Fig. 4, or guide rails 53 may be mounted over the floor 21, as illustrated in Fig. 5, to maintain the body 55 of the rake in elevated relationship with respect to the floor. The bed should not be less than two inches thick, hence the guides 51 or 55 should be designed to hold the body of the rake at least two inches from the floor and the wall member 49 may project two inches thereabove.

Figure 7:
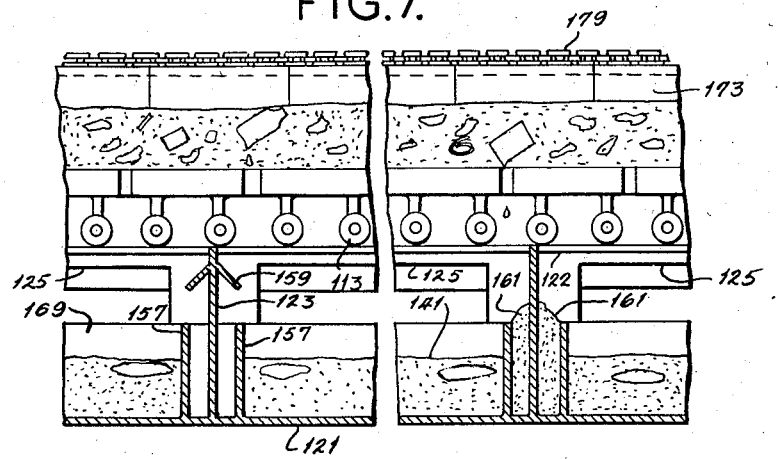
Fig. 7 is a section taken on the line 7—7 of Fig. 6.

Referring now to Figs. 6 and 7, there is shown means for preventing localized heating of the side walls of a wind box. As before, the machine has a wide endless belt of chain links 113, the upper reach of which constitutes a moving grate upon which the material to be burned or heated is carried. Wind boxes opening upwardly beneath the grate comprise a floor 121 extending over the lower reach of chain-grate links 113, with transverse partitions 123 sealed thereto. The partitions extend vertically from the floor to the lower surface of the links 113, which ride upon longitudinal rails 122. The wind boxes are then closed along one side of the machine by a wall 124 and along the other side by a wall 126. Openings 125 in the wall 124 communicate with a lateral duct or blower manifold 127, and gates 129 are provided to control the draft at each box. Openings 145 are provided in the opposite wall 126 to permit removal of accumulated ash, these openings normally being closed by gates 147.

As disclosed previously, a bed of ash 141 is permitted to accumulate on the floor of each wind box, this bed being made up principally of ash-like sifting, but also including some molten material. Inasmuch as the bed is never removed entirely, the floor 121 is isolated from the localized heating effects of the molten material, but the other portions 123, 124 and 126 of the box receive little protection from this bed of siftings.

Fig. 7 illustrates an economical system for protecting one or more of these vertical walls by means of baffles 157 extending upwardly from the floor 121 the full width of the machine. Otherwise, the baffles are located adjacent to but in spaced relationship from the sealed partitions 123, so as to define spaces therebetween. These spaces may be hooded, as indicated at 159, so as to prevent entry of molten material; or they might be filled with ash, as indicated at 161, for the same purpose. Although the molten material may come in contact with the baffles and cause them to warp, any cracks that open therein do not have a deleterious effect on the operation of the machine. In other words, the baffles serve to isolate the sealing partitions 123 from the non-uniform heating effects of molten material.

The invention also contemplates that the vertical plates of a wind box might be protected from non-uniform heating by means of a cooling medium, such as water. This system is particularly illustrated in Fig. 6, wherein the sides 124 and 126 are of a double-walled construction. A wall 163 projects upwardly from the floor 121 inwardly from the wall 126 and is closed by a sloping portion 165, thereby defining a longitudinal water passageway. A similar wall 167 extends from the floor 121 adjacent the opposite side 124 and is closed at its top by web 169. Water connections 171 are made to the water passageways so defined to maintain a circulation of water. When a molten mass collects near one of the walls 163 or 167, the water absorbs the heat and spreads the heat more uniformly across the plate, thereby minimizing the possibility of warping.

From the foregoing description, it is apparent that those skilled in the art will understand the structure, function and mode of operation of the invention herein disclosed, and appreciate the advantages thereof. Although several embodiments have been disclosed in detail, it is to be understood that the invention is not limited thereto, but the drawings and description thereof are to be understood as being merely illustrative. For example, whereas the machine described is particularly suited for burning refuse, the invention is also applicable in aggregating, drying and sintering machines. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. An incinerator of the character described comprising a continuous moving grate with upper and lower reaches, an upwardly-opening sheet-metal wind box disposed between said upper and lower reaches, said wind box having a floor and an openable side through which siftings may be removed, and duct means connected to the wind box at one side for establishing a draft, and a rake for removing said siftings through said openable side, said rake having a body portion, and means maintaining the body portion of the rake in spaced elevated relationship with respect to the floor of the wind box so as to maintain a bed of siftings of predetermined minimum thickness, thereby to support molten material falling into the wind box in insulated relationship from the sheet-metal floor of the wind box.

2. Apparatus as set forth in claim 1, wherein said openable side includes a generally rectangular opening and a closure therefor, said opening having a lower edge disposed above the floor of said wind box, thereby to maintain said bed of siftings of predetermined minimum thickness.

References Cited in the file of this patent

UNITED STATES PATENTS

| | | |
|---|---|---|
| 517,645 | Coxe | Apr. 3, 1894 |
| 535,412 | Richards | Mar. 12, 1895 |
| 767,648 | Korjibsky | Aug. 16, 1904 |
| 1,423,540 | Poppenhausen | July 25, 1922 |
| 1,625,077 | Duncan | Apr. 19, 1927 |
| 1,693,628 | Van Brunt | Dec. 4, 1928 |
| 1,698,113 | Van Brunt | Jan. 8, 1929 |
| 1,774,333 | Laist | Aug. 26, 1930 |